(12) United States Patent
Yoshida

(10) Patent No.: US 7,284,388 B2
(45) Date of Patent: Oct. 23, 2007

(54) AIR CONDITIONER

(75) Inventor: Shinichi Yoshida, Nisshin (JP)

(73) Assignee: DENSO Corporation, Kariya (JP)

( * ) Notice: Subject to any disclaimer, the term of this patent is extended or adjusted under 35 U.S.C. 154(b) by 218 days.

(21) Appl. No.: 11/224,716

(22) Filed: Sep. 12, 2005

(65) Prior Publication Data

US 2006/0053818 A1   Mar. 16, 2006

(30) Foreign Application Priority Data

Sep. 16, 2004   (JP)   ............... 2004-270464

(51) Int. Cl.
   *F25D 21/14*   (2006.01)
(52) U.S. Cl. .............. 62/285; 62/288; 62/291
(58) Field of Classification Search ............... 62/150, 62/272, 285, 288, 289, 290, 291; 165/913
See application file for complete search history.

(56) References Cited

U.S. PATENT DOCUMENTS

| | | | | |
|---|---|---|---|---|
| 2,238,543 A | * | 4/1941 | Trotter ................ | 62/285 |
| 4,843,835 A | * | 7/1989 | Goetz et al. .......... | 62/285 |
| 4,882,911 A | * | 11/1989 | Immel ................. | 62/288 |
| 5,481,886 A | * | 1/1996 | Hasegawa et al. ...... | 62/285 |
| 5,499,514 A | * | 3/1996 | Ho .................... | 62/291 |
| 5,787,721 A | * | 8/1998 | Fromm et al. ......... | 62/285 |
| 6,343,480 B1 | * | 2/2002 | Correa et al. ........ | 62/288 |
| 6,422,028 B1 | * | 7/2002 | Kim .................. | 62/285 |
| 6,437,851 B2 | * | 8/2002 | Hagiwara ............. | 355/30 |
| 6,481,232 B2 | * | 11/2002 | Faqih ................ | 62/291 |
| 6,497,255 B1 | * | 12/2002 | Adams et al. ......... | 138/149 |
| 6,698,225 B2 | * | 3/2004 | Chaves ............... | 62/285 |
| 6,883,336 B2 | * | 4/2005 | Dudley et al. ........ | 62/115 |

FOREIGN PATENT DOCUMENTS

| | | |
|---|---|---|
| JP | 64-28716 | 2/1989 |
| JP | 10-311661 A | * 11/1998 |

* cited by examiner

*Primary Examiner*—Mohammad M. Ali

(57) ABSTRACT

An air conditioner has an air conditioning case, a heat exchanger disposed in the air conditioning case to cool air therein, a drain pan disposed at a lower side of the heat exchanger to receive condensed water and the like, and a partition wall which is disposed between a lower surface of the heat exchanger and the drain pan to separate an air upstream side from an air downstream side in the air conditioning case. The drain pan has a drain hole, through which condensed water is discharged. An end portion of the partition wall intersects the drain hole and partitions the drain hole into the air upstream side and the air downstream side.

12 Claims, 6 Drawing Sheets

AIR CONDITIONER

CROSS REFERENCE TO RELATED APPLICATION

This application is based on a Japanese Patent Application No. 2004-270464 filed on Sep. 16, 2004, the disclosure of which is incorporated herein by reference.

Field of the Invention

The present invention relates to an air conditioner having a drain arrangement for discharging, for example, condensed water from a cooling heat exchanger.

BACKGROUND OF THE INVENTION

Generally, a drain arrangement of an air conditioner is provided with a partition wall in order to separate an air introduction side of a heat exchanger from an air discharge side thereof, for example, referring to JP-U-64-28716. A predetermined gap is arranged between a bottom surface of the heat exchanger and a drain pan of the drain arrangement. In this case, a clogging due to dust and the like in the gap is restricted, and condensed water is guided to drop onto the drain pan.

However, in this case, a groove is formed at a lower surface of the partition wall or a bottom surface of the drain pan to guide condensed water to a drain discharge hose. Therefore, air to be conditioned will leak through the groove to bypass the heat exchanger.

Referring to a comparison example as shown in FIG. 10, the space between a bottom surface of a heat exchanger 131 and a drain pan 112 is completely partitioned by a partition wall 140. Two drain holes 113 are respectively disposed at an air upstream side and an air downstream side with respect to the partition wall 140. Condensed water flowing through the drain holes 113 is converged at a confluence portion 115a of a discharge pipe 115, and discharged through the discharge pipe 115, as indicated by the broken-line arrows in FIG. 10. As a result, the air upstream side is communicated with the air downstream side at the confluence portion 115a, as indicated by the solid-line arrows in FIG. 10. Therefore, in this case, air to be conditioned cannot be restricted from bypassing the heat exchanger 131.

SUMMARY OF THE INVENTION

In view of the above-described disadvantage, it is an object of the present invention to provide an air conditioner, in which air to be conditioned is substantially restricted from bypassing a heat exchanger so that a heat-exchanging performance is improved.

According to the present invention, an air conditioner is provided with an air conditioning case defining an air passage therein, a heat exchanger disposed in the air conditioning case to cool air therein, a drain pan disposed at a lower side of the heat exchanger to receive condensed water from the heat exchanger, and a partition wall which is disposed between a lower surface of the heat exchanger and the drain pan to separate an air upstream side from an air downstream side in the air conditioning case. The drain pan has a drain hole, through which condensed water is discharged. An end portion of the partition wall intersects the drain hole to partition the drain hole into one part at the air upstream side and other part at the air downstream side.

Accordingly, the drain hole is partitioned into the air upstream side and the air downstream side by the partition wall, so that air of the upstream side flows outward through an upstream opening of the drain hole and air of the downstream side flows outward through a downstream side opening of the drain hole. Thus, air to be conditioned can be substantially restricted from bypassing the heat exchanger. In this case, condensed water accumulated on the drain pan can be efficiently discharged together with air, through the upstream side opening and the downstream side opening.

Preferably, the air conditioner further includes a drain pipe, which is connected with the drain pan at the drain hole and extends toward an outer side of the air conditioning case. The partition wall has an extension portion which extends from the end portion of the partition wall toward the outer side of the air conditioning case through the drain hole.

Accordingly, an aspirator effect will be caused in the drain pipe. That is, the slow one of air of the upstream side and air of the downstream side is sucked by the speedy one of them. Thus, condensed water can be further efficiently discharged.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENT

First Embodiment

Figure 1:
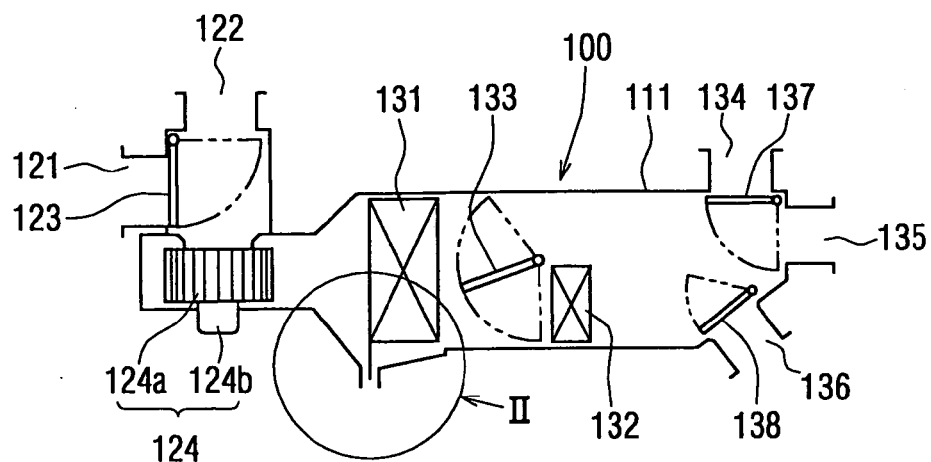
FIG. 1 is a schematic sectional view showing a whole construction of an air conditioner according to a first embodiment of the present invention.

An air conditioner 100 according to a first embodiment of the present invention will be described with reference to FIGS. 1-2. The air conditioner 100 includes a blower 124, an evaporator 131, a heater 132 and the like, which are accommodated in an air conditioning case 111. The air conditioner 100 is suitably used for a vehicle, for example. In this case, the air conditioner 100 can be arranged inside an instrument panel of the vehicle.

The air conditioning case 111 defines therein an air passage, through which conditioned air is guided into a passenger compartment (not shown) of the vehicle. An inside air inlet 121 and an outside air inlet 122 are formed at the air conditioning case 111 and disposed at the most upstream side of air flowing in the air conditioning case 111. Air (inside air) inside the passenger compartment can be introduced into the air conditioning case 111 through the inside air inlet 121. Air (outside air) outside the passenger compartment can be introduced into the air conditioning case 111 through the outside air inlet 122. An inside/outside air switching door 123 is provided to switch air inlet modes, so that outside air and inside air are selectively introduced into the air conditioning case 111.

A defroster blowing-out port 134, a face blowing-out port 135, a foot blowing-out port 136 and blowing-out mode switching doors 137 and 138, through which air blowing-out modes are switched, are arranged at the most downstream side of air flowing in the air conditioning case 111.

The blower 124 has a centrifugal fan 124a which is rotatably accommodated in a scroll case integrated with the air conditioning case 111, and a blower motor 124b for rotating (driving) the centrifugal fan 124a.

The evaporator 131 is a cooling heat exchanger, in which a refrigerant cycle system (not shown). is provided. The evaporator 131 is arranged in the air conditioning case 111, and obstructs the air passage therein except the lower portion of the air passage. The air conditioning case 111 is provided with a drain arrangement (indicated as "A" in FIG. 1 and described later) located at the lower side of the evaporator 131. Air flowing into the evaporator 131 is heat-exchanged with refrigerant of the refrigerant cycle system in the evaporator 131. That is, the refrigerant absorbs an evaporation latent heat from air to be evaporated, so that air therein is cooled (conditioned). Then, conditioned air is discharged from the evaporator 131.

The heater 132 is a heating heat exchanger and disposed in a heating device (not shown). The heater 132 can be communicated with an engine of the vehicle through a warm water duct, so that warm water from the engine flows through the heater 132 to heat air passing the heater 132 as a heat source.

An air mixing door 133 is arranged between the evaporator 131 and the heater 132, so that a mixing ratio of air cooled by the evaporator 131 to air heated by the heater 132 can be adjusted responding to an opening degree of the air mixing door 133. Thus, air in the air conditioning case 111 can be maintained at a predetermined temperature to be provided for the passenger compartment.

The air conditioning case 111 is provided with the drain arrangement (indicated as "A" in FIG. 1) located at the lower side of the evaporator 131. Rainwater entering the air conditioning case 111 through the outside air inlet 122, condensed water produced in the heat-exchanging in the evaporator 131, and the like are discharged out of the vehicle through the drain arrangement.

Figure 2:
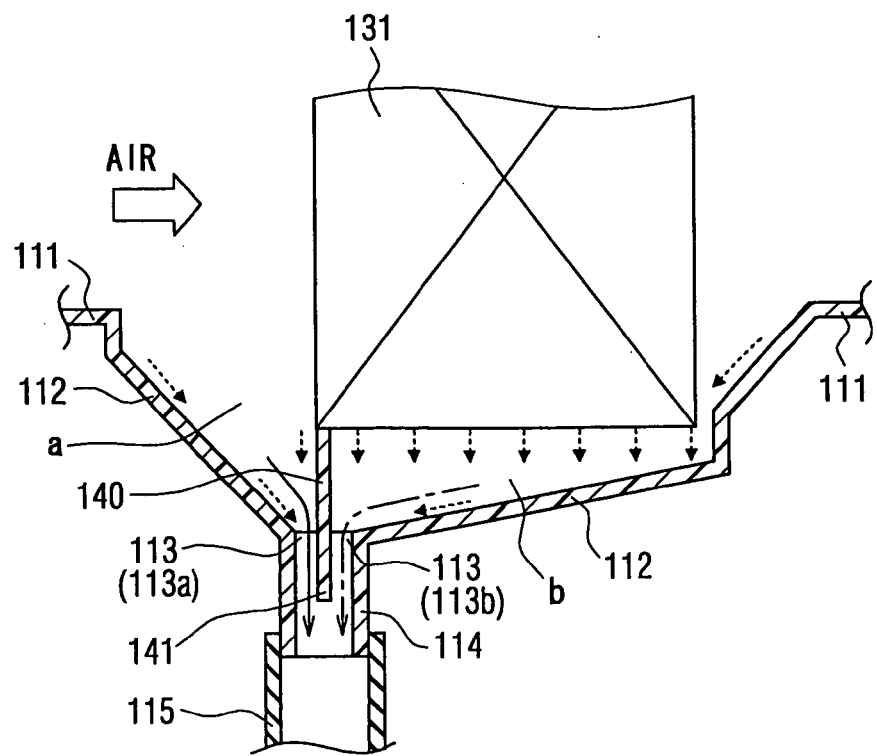
FIG. 2 is an enlarged schematic sectional view of a part II in FIG. 1.

As shown in FIG. 2, the drain arrangement includes a drain pan 112 at which a drain hole 113 is formed, a drain pipe 114 which defines a fluid passage therein and is integrated with the drain pan 112 at the drain hole 113, and a discharge pipe 115 which is fixedly connected with the drain pipe 114 at the opposite end of the drain pipe 114 to the drain hole 113. The drain pipe 114 extends from the drain hole 113 toward the outer side of the air conditioning case 111. The drain pipe 114 is communicated with the outer side of the passenger compartment through, for example, the discharge pipe 115.

According to this embodiment, the drain arrangement further includes a plate-shaped partition wall 140 having an extension portion 141. The partition wall 140 is integrally connected with the evaporator 131. The partition wall 140 can be arranged at an air introduction side end of the evaporator 131, for example. The air introduction side end of the evaporator 131 is an end (i.e., end of air flowing direction in air conditioning case 111) of the air introduction side of the evaporator 131. The partition wall 140 is disposed between the lower side of the evaporator 131 and the drain pan 112. The extension portion 141 extends from a lower end of the partition wall 140 toward the outer side of the air conditioning case 111.

The partition pan 112 for receiving condensed water and the like is integrated with the air conditioning case 111 and disposed at the lower side of the evaporator 132. A space is formed between the lower side of the evaporator 132 and the partition pan 112. The drain pan 112 has an inclined surface with a lowest end, at which the drain hole 113 is formed (opened).

The drain pipe 114 is integrated with the partition pan 112 and extends downward (i.e., toward outer side of air conditioning case 111). The drain hole 113 is disposed at the top end of the drain pipe 114. The discharge pipe 115 is fixed to the bottom end of the drain pipe 114, and communicated with the outside of the passenger compartment. In this embodiment, the drain hole 113 is arranged at an air introduction side of the evaporator 131, and disposed at a substantial center portion of a thickness direction (i.e., face-back direction of paper of FIG. 2) of the evaporator 131.

The plate-shaped partition wall 140 is disposed between the lower surface of the evaporator 132 and the drain pan 112, to separate the air upstream side from the air downstream side with respect to the evaporator 131. In this case, the lower end of the partition wall 140, which extends substantially in the axis direction of the drain pipe 114, intersects (partitions) the drain hole 113.

Moreover, the partition wall 140 is provided with the extension portion 141, which extends downward by a predetermined length from the lower end of the partition wall 140. Thus, the drain hole 113 is divided into an upstream side opening 113a at the air upstream side, and a downstream side opening 113b at the air downstream side.

The space between the drain pan 112 and the evaporator 131 is divided into an air upstream side space "a" and an air downstream side space "b" by the partition wall 140. As described later, the drain pipe 114 and the extension portion 141 construct an aspirator arrangement.

In this case, the drain hole 113 and the drain pipe 114, which extends from the drain hole 113 toward the outside of the air conditioning case 111, construct a drain passage. The ventilation resistance of the drain passage is set, so that a small amount of air is admit to flow through the drain passage without excessively influencing a total amount of air introduced into the air conditioning case 111. Thus, the amount of air leaked through the drain passage can be restricted, while condensed water can be discharged.

Moreover, the drain hole 113 of the drain passage is opened at both the air upstream side of the evaporator 131 and the air downstream side thereof which are partitioned by the partition wall 140, so that the drain passage is communicated with both the air upstream side and the air downstream side. Thus, condensed water from both the air upstream side and the air downstream side of the evaporator 131 can be discharged out of the passenger compartment through the drain pipe 114.

Furthermore, the extension portion 141 is arranged at the lower end of the partition wall 140, and extends from the position corresponding to the drain hole 113 into the drain pipe 114. Thus, the extension portion 141 having the predetermined length partitions the space in the drain passage into one part (upstream side space) directly communicated with the air upstream side of the evaporator 131 and other part (downstream side space) directly communicated with the air downstream side of the evaporator 131.

That is, the drain passage is divided into two parts with respect to the diametrical cross section of the drain passage by the plate-shaped extension portion 141. In this case, the two parts of the drain passage extend in the axial direction (i.e., longitudinal direction) of the drain passage. The length (partition length) of the divided space in the drain passage is set to have a predetermined value, so that at least the drain hole 113 is divided into two parts. The partition length of the drain passage is a dimension from the drain hole 113, which is the opening of the drain passage at the side of the air conditioning case 111. For example, the partition length of the drain passage can be set smaller than or equal to the length of the drain pipe 114.

The drain passage has a definite section with a sufficiently small area, as compared with the air passage (main passage) defined in the air conditioning case 111. Therefore, each of the upstream side space and the downstream side space, which are partitioned in the drain passage and extend in the axis direction thereof, has a high ventilation resistance against air which flows from the air upstream side of the evaporator 131 toward the air downstream side thereof. The partition length of the drain passage (i.e., partition length of passage defined in drain pipe 114) can be set to adjust the ventilation resistance, so that the amount of air flowing from the upstream side space toward the downstream side space is restricted to be smaller than or equal to a predetermined value.

Next, operation and effect of the air conditioner 100 having the above-described construction will be described.

When the evaporator 131 is operated to cool air which is introduced therein by the blower 124 or the like, condensed water produced by the evaporator 131 will drop onto the drain pan 112 from side surfaces and the lower surface of the evaporator 131. Then, as indicated by the broken-line arrows in FIG. 2, condensed water in the air upstream side space "a" flows into the drain pipe 114 through the upstream side opening 113a along the incline surface of the drain pan 112 at the side of the air upstream side space "a", and condensed water in the air downstream side space "b" flows into the drain pipe 114 through the downstream side opening 113b along the incline surface of the drain pan 112 at the side of the air downstream side space "b". Condensed water flowing into the drain pipe 114 will be discharged out of the passenger compartment through the discharge pipe 115.

On the other hand, the pressure of air inside the air conditioning case 111 is higher than that outside the air conditioning case 111. In the air conditioning case 111, the pressure of the air upstream side space "a" is higher than that of the air downstream side "b" due to a pressure loss of the evaporator 131.

Therefore, air from the air upstream side space "a" becomes a main airflow (indicated by solid-line arrow in FIG. 2) into the drain pipe 114 through the upstream side opening 113a. In this case, condensed water in the upstream side space "a" is pressed by the main airflow, to actively flow into the drain pipe 114.

Air (conditioned air) from the air downstream side space "b" is a subsidiary airflow (indicated by one-point chain line arrow in FIG. 2) into the drain pipe 114 through the downstream side opening 113b. The main airflow from the air upstream side space "a" flows more speedily than the subsidiary airflow. According to this embodiment, the drain pipe 114 and the extension portion 141 construct the aspirator arrangement. In this case, the subsidiary airflow is absorbed by the main airflow, due to the aspirator effect of the drain pipe 114 and the extension portion 141. Therefore, condensed water in the air downstream side space "b" will be pressed by the subsidiary airflow which is sucked by the main airflow, thus actively flowing into the drain pipe 114.

According to this embodiment, the partition wall 140 obstructs the air passage at the lower side of the evaporator 131, and partitions the space between the evaporator 131 and the drain pan 112 into the air upstream side space "a" and the air downstream side space "b" with respect to the evaporator 131. Thus, air to be conditioned (cooled) can be restricted from bypassing the evaporator 131. Therefore, a deterioration of cooling performance of the air conditioner 100 can be restricted.

Because air is restricted from bypassing the evaporator 131, condensed water in the air downstream side space "b" can be prevented from being blown into the passenger compartment from the blowing-out ports 134-136. Furthermore, when a control operation of the air conditioner 100 is performed to detect the temperature of conditioned air which is cooled by the evaporator 131, the influence of air bypassing the evaporator 131 can be avoided. Thus, a temperature-detecting failure is reduced.

According to this embodiment, the partition wall 140 is provided with the extension portion 141 extending into the drain pipe 114, so that the main airflow from the air upstream side space "a" to the drain pipe 114 and the subsidiary airflow from the air downstream side space "b" to the drain pipe 114 are formed. The subsidiary airflow is absorbed by the main airflow. Thus, condensed water on the drain pan 112 can be substantially discharged out of the air conditioning case 111 and the passenger compartment. That is, the flow direction of condensed water and that of the airflow (main airflow or subsidiary airflow) are accorded with each other, so that condensed water can be efficiently discharged.

Second Embodiment

Figure 3:
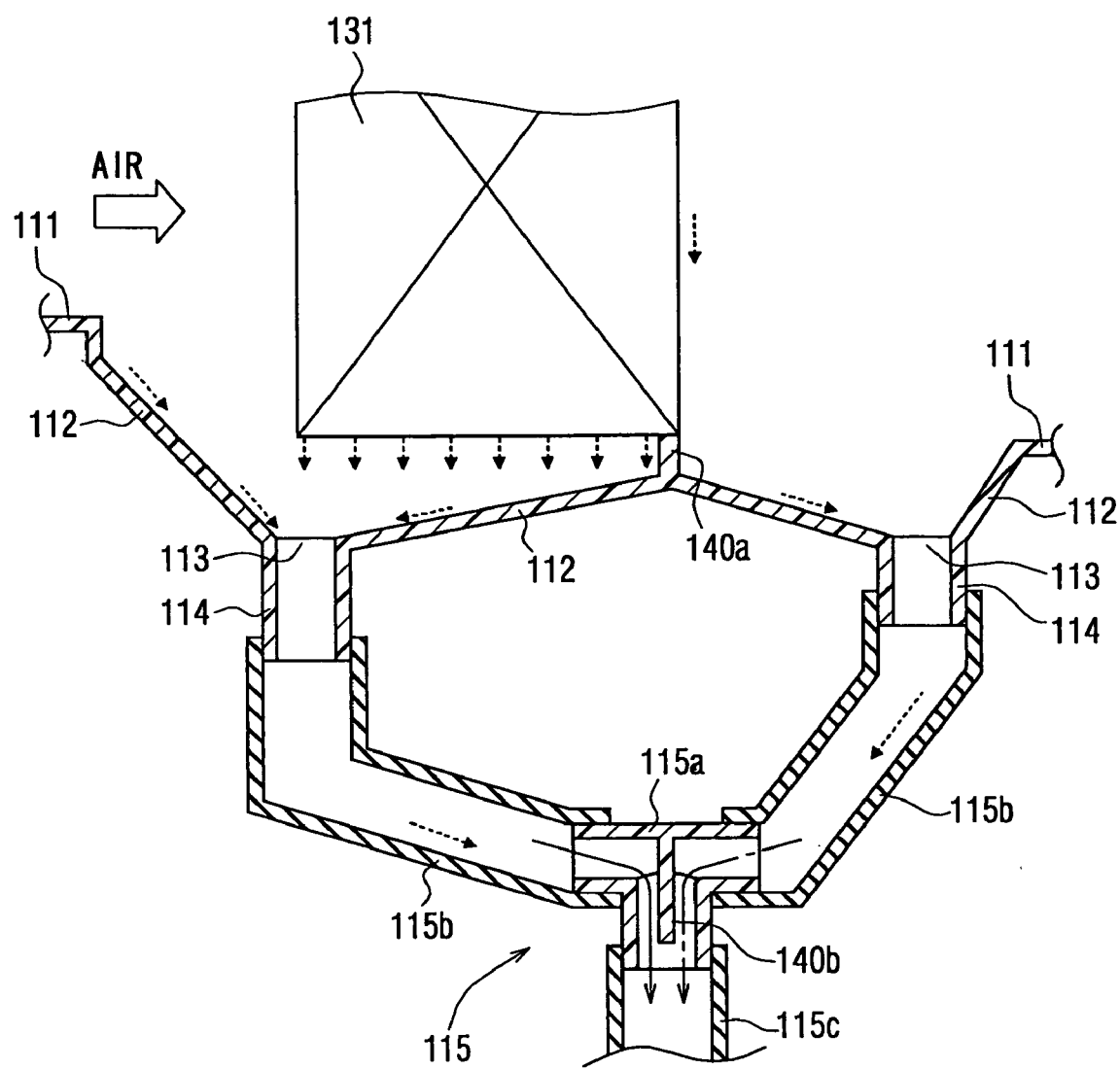
FIG. 3 is a schematic sectional view showing a drain arrangement according to a second embodiment of the present invention.

A second embodiment of the present invention will be described with reference to FIG. 3. In the second embodiment, the two drain holes 113 and the two drain pipes 114 are provided, as compared with the above-described first embodiment where the drain arrangement has the single drain hole 113 and the single drain pipe 114.

According to the second embodiment, a first partition wall 140a is arranged between the lower surface of the evaporator 131 and the drain pan 112, to partition the space therebetween into the air upstream side and the air downstream side with respect to the evaporator 131.

The first partition wall 140a is integrally connected with the evaporator 131. The first partition wall 140a can be arranged at the air discharge side end of the evaporator 131 as shown in FIG. 3. Alternatively, the first partition wall 140a can be also arranged at the air introduction side end of the evaporator 131, for example.

The drain pan 112 is provided with the two drain holes 113. The two drain pipes 114, being integrated with the drain pan 112, respectively extends from the two drain holes 113 toward the outer side of the air conditioning case 111.

The two drain holes 113 (two drain pipes 114) are respectively arranged at two sides of the first partition wall 140a. That is, the two drain holes 113 (two drain pipes 114) are respectively disposed at the air upstream side of the evaporator 131 and the air downstream side thereof.

In this case, the discharge pipe 115 includes two branch portion 115b, a confluence portion 115a and a trunk portion 115c, which are integrally fixed to each other. Upper ends of the two branch portions 115b are respectively fixedly connected with the two drain pipes 114, and lower ends thereof are connected (communicated) with each other through the confluence portion 115a. The confluence portion 115a is further communicated with the trunk portion 115c at the upper end of the trunk portion 115c, which is communicated with the outer side of the passenger compartment.

A second partition wall 140b is arranged in the confluence portion 115a, and extends toward the outer side of air conditioning case. The second partition wall 140b partitions the space in the trunk portion 115c into the upstream side space directly communicated with the air upstream side and the downstream side space directly communicated with the air downstream side.

The second partition wall 140b can extend substantially in the axial direction of the truck portion 115c to have a length, which can be set so that the amount of air flowing from the upstream side space toward the downstream side space is smaller than or equal to a predetermined value. The first partition wall 140a and the second partition wall 140b have a plate shape, for example.

In the second embodiment, the two drain holes 113 are provided respectively corresponding to the upstream side opening 113a and the downstream side opening 113b described in the first embodiment, and the second partition wall 140b is provided to have the construction corresponding to the extension portion 141 described in the first embodiment. Therefore, the air conditioner 100 having the construction described in the second embodiment can have the same effect to that provided in the first embodiment.

Third Embodiment

Figure 4:
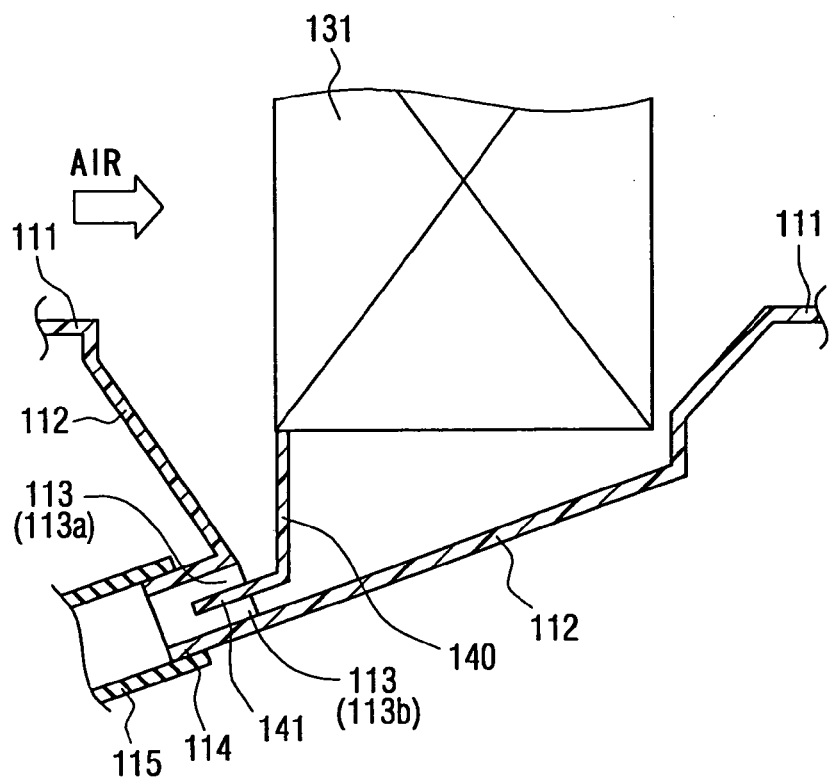
FIG. 4 is a schematic sectional view showing a drain arrangement according to a third embodiment of the present invention.

The drain hole 113 and the drain pipe 114 can be also arranged as shown in FIG. 4 according to a third embodiment of the present invention, to improve a mounting performance of the discharge pipe 115 which protrudes out of the air conditioning case 111.

Referring to FIG. 4, the drain pipe 114 and the discharge pipe 115 are inclined toward the side of the blower 124, as compared with those described in the first embodiment (referring to FIG. 2). The drain pipe 114 and the discharge pipe 115 can be tilted to be parallel to the incline surface of the drain pan 112.

In this case, the extension portion 141 is tilted with respect to the partition wall 140 corresponding to the slant arrangement of the drain pipe 114 (discharge pipe 115).

Fourth Embodiment

Figure 5:
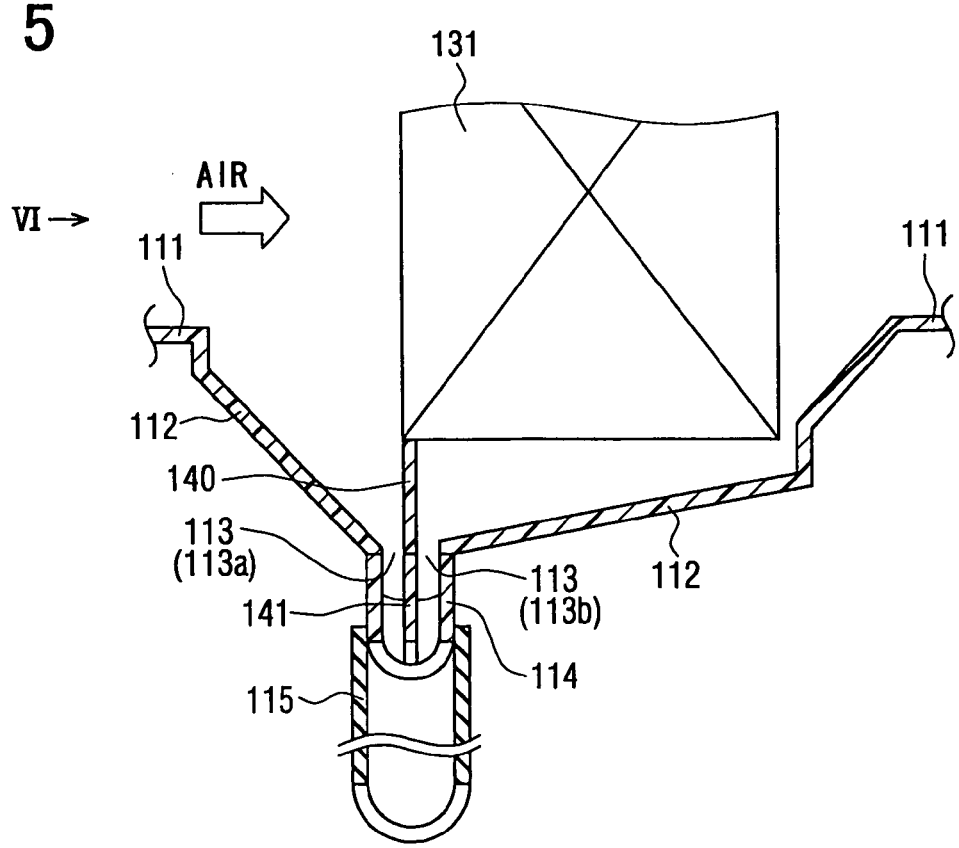
FIG. 5 is a schematic sectional view showing a drain arrangement according to a fourth embodiment of the present invention.
Figure 6:
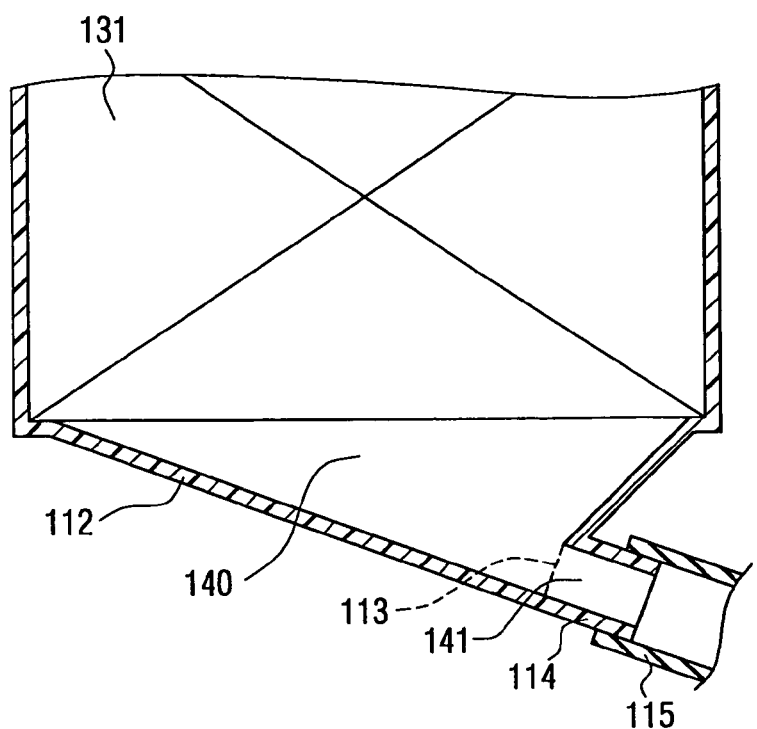
FIG. 6 is a schematic sectional view showing the drain arrangement viewed in an arrow direction VI in FIG. 5.

According to a fourth embodiment of the present invention, the drain pipe 114 and the discharge pipe 115 are tilted toward a face side of the paper of FIG. 5, as compared with those shown in FIG. 2 in the first embodiment. The axial direction of the drain pipe 114 and the discharge 115 intersects the flowing direction of air in the air passage defined in the air conditioning case 111. Referring to FIG. 6, the extension portion 141 of the partition wall 140 extends to the lower end of the drain pipe 114.

Fifth Embodiment

Figure 7:
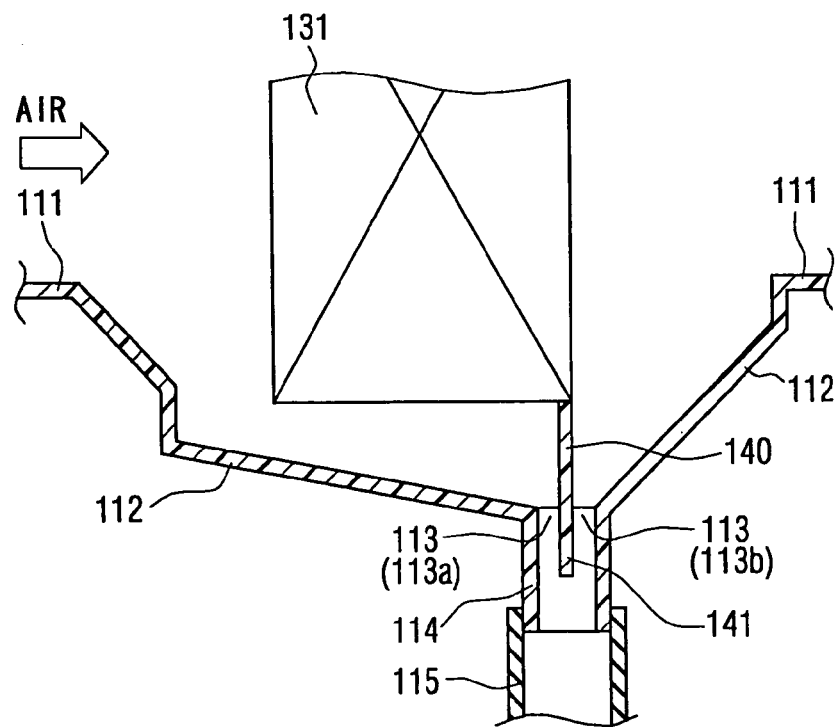
FIG. 7 is a schematic sectional view showing a drain arrangement according to a fifth embodiment of the present invention.

According to a fifth embodiment of the present invention, referring to FIG. 7, the partition wall 140 (extension portion 141) is arranged at an air discharge side end of the evaporator 131. The air discharge side end of the evaporator 131 is an end (i.e., end of air flowing direction in air conditioning case 111) of the air discharge side of the evaporator 131. Correspondingly, the drain hole 113 and the drain pipe 114 are arranged so that the extension portion 141 of the partition wall 140 protrudes into the drain hole 113 and the drain pipe 114 and extends substantially in the axial direction of the drain pipe 114.

Sixth Embodiment

Figure 8:
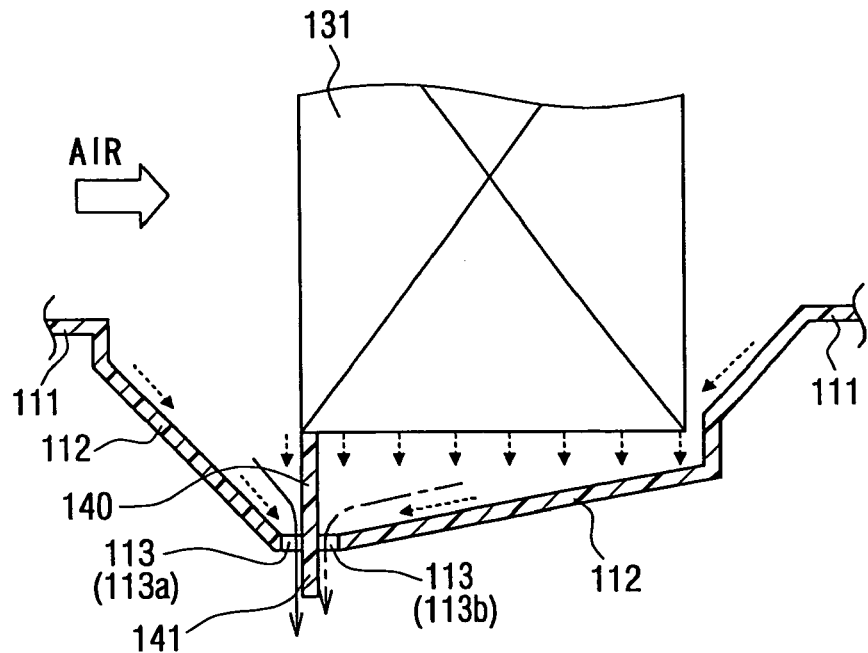
FIG. 8 is a schematic sectional view showing a drain arrangement according to a sixth embodiment of the present invention.

According to a sixth embodiment of the present invention, referring to FIG. 8, the drain pipe 114 and the discharge pipe 115 are omitted. In this case, condensed water is discharged out of the air conditioning case 111 through the drain hole 113, and the extension portion 141 of the partition wall 140 protrudes from the drain hole 113.

Seventh Embodiment

Figure 9:
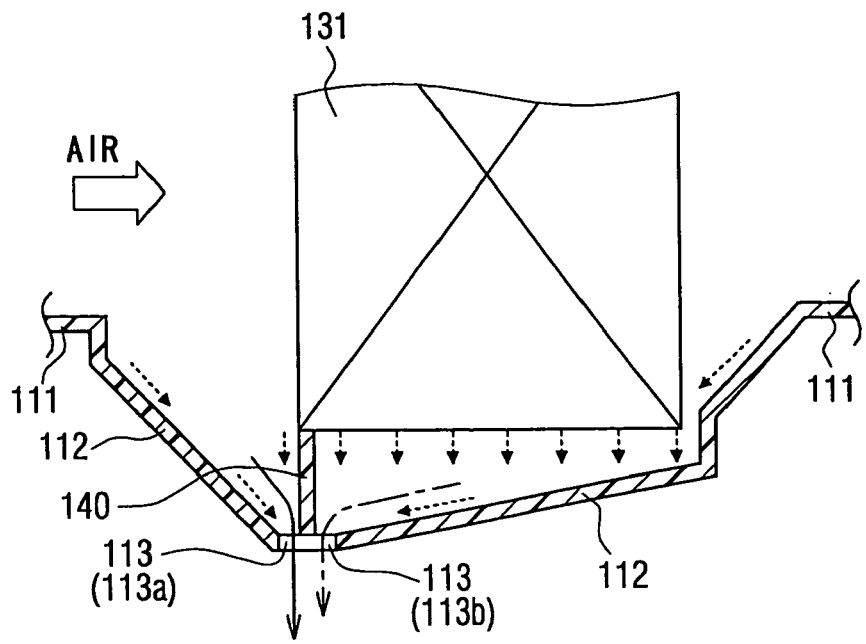
FIG. 9 is a schematic sectional view showing a drain arrangement according to a seventh embodiment of the present invention.
Figure 10:
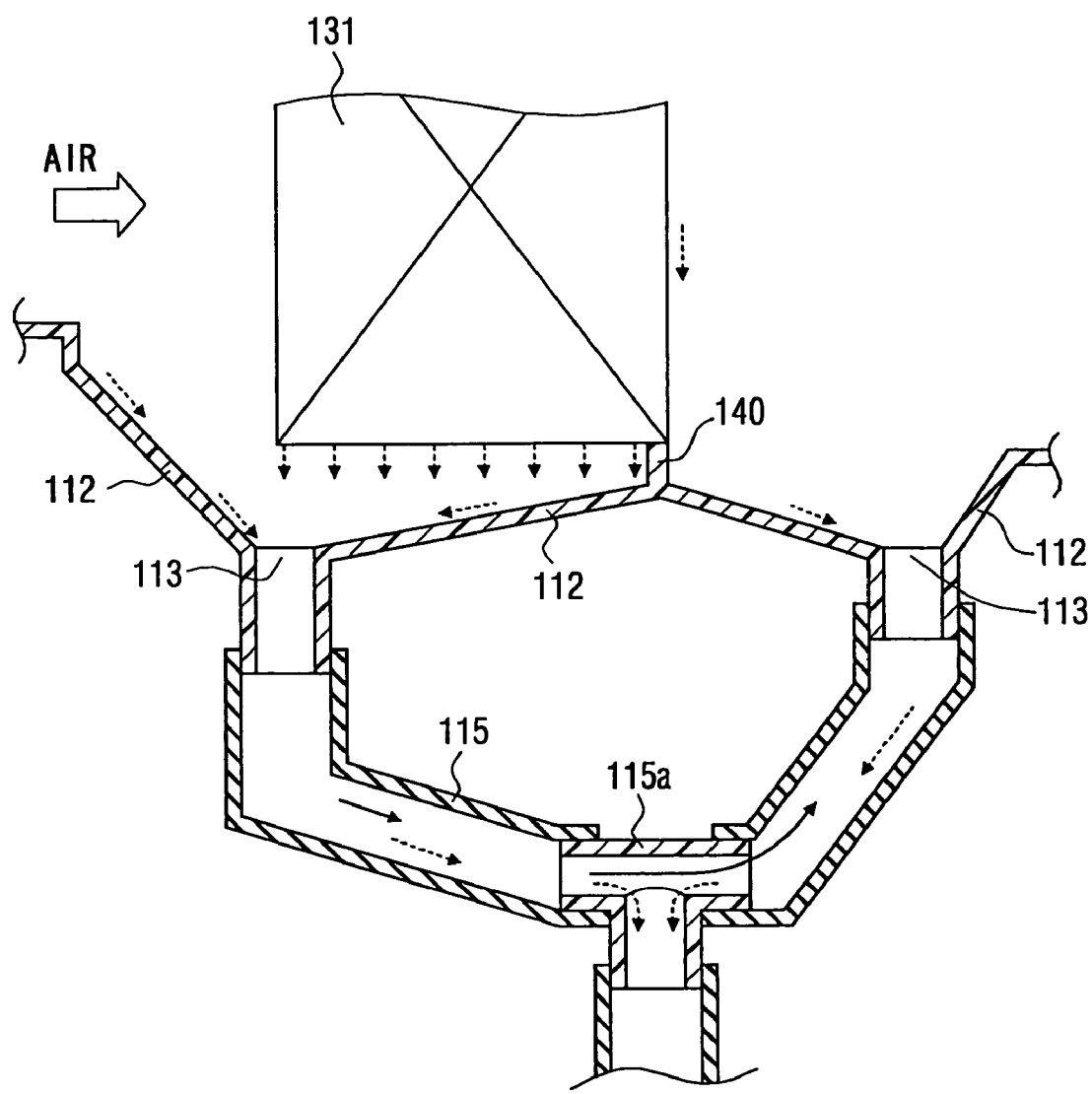
FIG. 10 is a schematic sectional view showing a drain arrangement according to a comparison example of a related art.

According to a seventh embodiment of the present invention, the drain pipe 114, the discharge pipe 115 and the extension portion 141 are omitted. In this case, the partition wall 140 extends from the lower surface of the evaporator 131 to the upper side of the drain hole 113, as shown in FIG. 9.

Other Embodiment

Although the present invention has been fully described in connection with the preferred embodiments thereof with reference to the accompanying drawings, it is to be noted that various changes and modifications will become apparent to those skilled in the art.

For example, the extension portion 141 of the partition wall 140 can also extend into the discharge pipe 115, considering the aspirator effect. The second partition wall 140b can also extend into the truck portion 115c of the discharge pipe 115.

Moreover, the discharge pipe 115 can be omitted, and the drain pipe 114 can be arranged to protrude from the air conditioning case 111.

The air conditioner 100 according to the present invention can be also suitably used to air-condition a building or the like.

Such changes and modifications are to be understood as being in the scope of the present invention as defined by the appended claims.

What is claimed is:

1. An air conditioner comprising:
an air conditioning case defining an air passage therein;
a heat exchanger disposed in the air conditioning case to cool air therein;
a drain pan disposed at a lower side of the heat exchanger, condensed water from the heat exchanger being received by the drain pan; and a partition wall, which is disposed between a lower surface of the heat exchanger and the drain pan to separate an air upstream side from an air downstream side in the air conditioning case, wherein:

the drain pan has a drain hole, through which condensed water is discharged; and an end portion of the partition wall intersects the drain hole to partition the drain hole into one part at the air upstream side and other part at the air downstream side.

2. The air conditioner according to claim 1, wherein the partition wall has an extension portion which extends from the end portion of the partition wall toward an outer side of the air conditioning case through the drain hole.

3. The air conditioner according to claim 1, further comprising
a drain pipe, which is connected with the drain pan at the drain hole and extends toward an outer side of the air conditioning case, wherein
the partition wall has an extension portion which extends from the end portion of the partition wall toward an outer side of the air conditioning case through the drain hole.

4. The air conditioner according to claim 3, wherein:
the extension portion partitions a fluid passage defined by the drain pipe into an upstream side space directly communicated with the air upstream side and a downstream side space directly communicated with the air downstream side; and
a partition length of the fluid passage has a predetermined value from the drain hole.

5. The air conditioner according to claim 4, wherein:
the partition length of the fluid passage defined by the drain pipe is set so that an amount of air flowing from the upstream side space toward the downstream side space is smaller than or equal to a predetermined value.

6. The air conditioner according to claim 3, wherein:
each of the partition wall and the extension portion has a plate shape.

7. The air conditioner according to claim 1, wherein:
the partition wall is arranged at an air introduction side end of the heat exchanger.

8. The air conditioner according to claim 1, wherein:
the partition wall is arranged at an air discharge side end of the heat exchanger.

9. An air conditioner comprising:
an air conditioning case defining an air passage therein;
a heat exchanger disposed in the air conditioning case to cool air therein;
a drain pan disposed at a lower side of the heat exchanger, condensed water from the heat exchanger being received by the drain pan,
the drain pan having two drain holes, through which condensed water is discharged, the drain holes being respectively arranged at an air upstream side and an air downstream side in the air conditioning case;
a first partition wall arranged between a lower surface of the heat exchanger and the drain pan to separate the air upstream side from the air downstream side, the first partition wall being disposed between the two drain holes;
a discharge pipe communicated with the two drain holes and extending to an outer side of the air conditioning case; and
a second partition wall which is arranged in a confluence portion of the discharge pipe to partition the confluence portion into an upstream side space directly communicated with the air upstream side and a downstream side space directly communicated with the air downstream side.

10. The air conditioner according to claim 9, wherein:
each of the first partition wall and the second partition wall has a plate shape.

11. The air conditioner according to claim 9, wherein:
the first partition wall is arranged at an air introduction side end of the heat exchanger.

12. The air conditioner according to claim 9, wherein:
the first partition wall is arranged at an air discharge side end of the heat exchanger.

* * * * *